(12) United States Patent
Gupta et al.

(10) Patent No.: US 8,996,215 B2
(45) Date of Patent: Mar. 31, 2015

(54) ACCELERATION PROFILE-BASED CONTROL OF AN OFFGOING CLUTCH OPERATION

(75) Inventors: Pinaki Gupta, Wixom, MI (US); Lawrence A. Kaminsky, White Lake, MI (US); Sean W. McGrogan, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 13/616,816

(22) Filed: Sep. 14, 2012

(65) Prior Publication Data

US 2014/0081491 A1  Mar. 20, 2014

(51) Int. Cl.
| | |
|---|---|
| B60W 10/02 | (2006.01) |
| B60W 20/00 | (2006.01) |
| F16D 48/06 | (2006.01) |
| F16H 61/02 | (2006.01) |
| F16H 61/28 | (2006.01) |
| F16H 61/68 | (2006.01) |

(52) U.S. Cl.
CPC ............. *F16D 48/06* (2013.01); *F16H 61/02* (2013.01); *F16H 61/28* (2013.01); *F16H 61/68* (2013.01); *F16D 2500/3109* (2013.01); *F16D 2500/10412* (2013.01); *F16D 2500/1066* (2013.01); *F16D 2500/30406* (2013.01); *F16D 2500/70424* (2013.01); *F16D 2500/70426* (2013.01)

USPC ................................ 701/22; 701/67; 192/31

(58) Field of Classification Search
CPC .......... F16D 48/06; F16D 2500/10412; F16D 2500/1066; F16D 2500/30406; F16D 2500/3109; F16D 2500/70424; F16D 2500/70426; F16H 61/02; F16H 61/28; F16H 61/68
USPC ........................................ 701/22, 67; 192/31
See application file for complete search history.

(56) References Cited

U.S. PATENT DOCUMENTS

| 6,319,172 B1 * | 11/2001 | Steinmetz et al. ............ 477/143 |
| 8,068,948 B2 * | 11/2011 | Sah et al. ......................... 701/22 |
| 8,357,074 B2 * | 1/2013 | Wu et al. ........................... 477/5 |

* cited by examiner

*Primary Examiner* — John Q Nguyen
*Assistant Examiner* — Alan D Hutchinson
(74) *Attorney, Agent, or Firm* — Quinn Law Group, PLLC

(57) ABSTRACT

A vehicle includes a torque generating device, a transmission, and a controller. The transmission has one or more clutches. The controller executes a method, which includes measuring an amount of slip across an identified offgoing clutches and determining whether the offgoing clutches have slipped prior to a modeled clutch torque capacity reaching zero. A status is assigned indicating that the offgoing clutches are released if the offgoing clutch has slipped prior to the modeled clutch capacity reaching zero. The controller induces slip across the identified offgoing clutches to a calibrated low, non-zero level after recording the value, including by enforcing the low, non-zero slip value using one or more acceleration profiles.

16 Claims, 2 Drawing Sheets

ACCELERATION PROFILE-BASED CONTROL OF AN OFFGOING CLUTCH OPERATION

TECHNICAL FIELD

The disclosure relates to the control of an offgoing clutch operation using one or more acceleration profiles.

BACKGROUND

Hybrid vehicle powertrains typically use multiple different torque generating devices such as an internal combustion engine and one or more electric traction motors to generate input torque to a transmission. Torque is transferred from an offgoing clutch during a synchronous shift. Unlike conventional transmissions, a synchronous shift within a hybrid transmission may not involve an oncoming clutch for offloading of torque, e.g., during execution of certain gear-to-mode or mode-to-neutral shifts. The process of torque transfer from one or more offgoing clutches during a shift followed by disengagement of the offgoing clutches is referred to as the torque phase of the shift.

SUMMARY

A control approach is disclosed herein for optimizing the release process of an offgoing clutch in a synchronous shift. The control approach uses one or more clutch acceleration profiles or other suitable acceleration profile during the synchronous shift as explained herein. Speed profiles may be used in closed loop control, while the acceleration profiles are used for open loop control. The acceleration profiles, for instance a transmission input acceleration profile or a clutch acceleration profile, induce clutch slip at the tail end of the torque phase of the commanded shift, i.e., when a modeled capacity of one or more identified offgoing clutches reaches zero. If offgoing clutch slip is observed before a modeled capacity drops to zero, the clutch is declared by a controller as being released, with a corresponding status being assigned to the offgoing clutch. If no clutch slip is observed after the modeled capacity drops to zero, the controller attempts to control the slip of the offgoing clutch to a small non-zero slip level using the calibrated acceleration profile.

The accelerations profile(s) are subsequently converted to actuator torques, i.e., motor and/or engine torques, based on the current transmission state. In addition, the acceleration profiles may be converted to speed profiles, which serve as references for a particular fast actuator such as an electric motor, to thereby control the actual transmission component speeds via real-time closed-loop feedback control.

At the beginning of the slip induction phase, the controller may temporarily disable closed-loop control associated with the particular speed profiles being used to induce offgoing clutch slip. Any error at this particular stage of control can be due to error in the modeled clutch pressure or modeling error of other components of the transmission. However, the offgoing clutch pressure modeling error is temporary as the residual clutch pressure eventually exhausts to zero, and therefore is not learned by the closed loop controller. Modeling error from other transmission components may persist and therefore restricted closed-loop efforts may be used as needed to slip the clutch after a calibrated amount of time elapses. The controller may also use the lack of observed clutch slip to diagnose a stuck clutch condition.

In particular, a vehicle is disclosed herein that includes a torque generating device, a transmission, and a controller. The transmission may includes an input member, a planetary gear set, and one or more clutches, at least one of which may be identified as an offgoing clutch during a commanded shift. The input member is connected to and receives input torque from the torque generating device, or multiple such devices, and also transfers the input torque through the planetary gear set in response to a commanded shift involving the identified offgoing clutch(es). The controller is in communication with the transmission, and includes a tangible, non-transitory memory device on which is recorded a modeled capacity of the clutch(es) and instructions for executing the commanded shift.

The controller is configured to execute the instructions via a processor to execute the commanded shift using an acceleration profile of each identified offgoing clutch. To do so, the controller induces slip across each offgoing clutch at a point of the torque phase of the commanded shift at which the modeled capacity is zero, as noted above.

A method is also disclosed herein that includes recording a modeled clutch capacity of a plurality of clutches in a transmission in memory of a controller, and receiving a request for a commanded shift involving one or more offgoing clutches. The method further includes identifying, via a controller, the particular offgoing clutch or clutches used to offload torque from a combination of torque generating devices during the commanded shift. An amount of slip across the offgoing clutch(es) is determined. The controller also determines whether each identified offgoing clutch has slipped prior to the modeled capacity reaching zero. If the offgoing clutch(es) have not slipped prior to the modeled clutch capacity reaching zero, offgoing slip is controlled by enforcing a calibrated low, non-zero slip value using one or more calibrated acceleration profiles.

The above features and the advantages of the present disclosure are readily apparent from the following detailed description of the best modes for carrying out the invention when taken in connection with the accompanying drawings.

DETAILED DESCRIPTION

Figure 1:
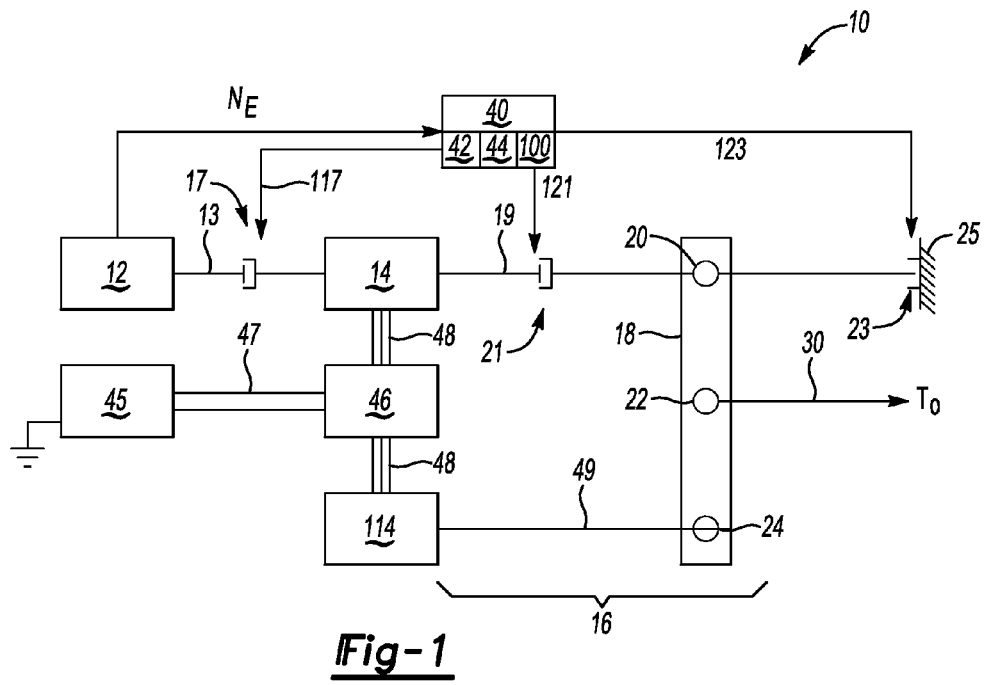
FIG. 1 is a schematic illustration of an example vehicle having a controller that is configured to control an offgoing clutch operation using acceleration profiles during a synchronous shift.

Referring to the drawings, an example vehicle 10 is shown schematically in FIG. 1 having an internal combustion engine 12, a transmission 16, and a controller 40. The controller 40 controls a synchronous shift between clutches within a transmission 16 from one transmission operating mode or state to another according to a method 100, an example of which is shown in FIG. 3 and explained below in conjunction with the set of clutch control traces 50 shown in FIG. 2. Computer-executable instructions embodying the required steps of the method 100 are recorded on a tangible, non-transitory memory device 42 and executed by a processor 44 to cause the controller 40 to enact speed profile-based control over an offgoing operation of the transmission 16 as set forth below.

Some hybrid powertrains maintain a threshold load across the offgoing clutch as pressure to the offgoing clutch is exhausted, thus forcing the offgoing clutch to slip during the release operation. However, the load required for inducing clutch slip is a function of the current transmission state and the target transmission state. Determining correct load in Offgoing states involving offloading of multiple clutches is even more complicated as the clutch loads can have cross correlations among themselves. As a result, a load that is appropriate for one transmission state may be insufficient in others resulting in inappropriate stuck clutch diagnosis, or the load may be excessive, thus resulting in a torque disturbance that may be perceptible by a vehicle occupant. Additionally, closed-loop slip control can work against the load as a controller attempts to drive the slip to zero. The present approach is therefore intended as an improvement to such torque-based slip induction.

The example vehicle 10 shown in FIG. 1 may use the engine 12 as needed to output engine torque, via an output shaft 13, to the transmission 16. In addition to the engine 12, other torque generating devices may include first and/or second motor/generator units (MGUs) 14 and 114. An input damping clutch assembly 17 may be disposed between the engine 12 and the first MGU 14, with clutch commands (arrow 117) transmitted to the input clutch assembly 17 by the controller 40 to selectively connect/disconnect the input clutch assembly 17 as needed, e.g., to dampen driveline vibration during an automatic restart of the engine 12.

When the engine 12 is running and the input clutch assembly 17 is engaged, the first MGU 14 in the configuration of FIG. 1 can be powered by engine torque, and thus can generate motor torque via a motor shaft 19. When the input clutch 17 is disengaged, the first MGU 14 can draw electrical energy over an AC bus 48 from a battery module 45 via a traction power inverter module (TPIM) 46. The TPIM 46 is connected to the battery module 45 via a DC bus 47, and is operable for converting DC to AC power and vice versa as needed depending on the control mode, for instance using pulse width modulation.

In the example embodiment shown in FIG. 1, a rotating clutch assembly 21 may be positioned between the first MGU 14 and a planetary gear set 18 having first, second, and third nodes 20, 22, and 24, respectively. The rotating clutch assembly 21 includes a driven and driving side, as is well known in the art, and thus torque may be transmitted from one or more offgoing clutches to one or more oncoming clutches within the clutch assembly 21 during a synchronous shift.

The clutch assembly 21 may be selectively engaged/disengaged via clutch commands (arrow 121) from the controller 40. The output side of the clutch assembly 21 is connected to a first node 20 of the planetary gear set 18. The second MGU 114 may be directly connected to a third node 24 of the same planetary gear set 18, while the second node 22 is connected to an output member 30 of the transmission 16. The third node 24 is directly connected via an interconnecting member 49 to the second MGU 114. Output torque (arrow To) is thus delivered via the output member 30 to the drive axle(s) of the vehicle 10, and ultimately to a set of drive wheels (not shown).

A braking clutch 23 may be used as part of the transmission 16 shown in FIG. 1. The braking clutch 23 is grounded to a stationary member 25 of the transmission 16 and connected to the first node 20. Engagement of the braking clutch 23 in response to clutch commands (arrow 123) from the controller 40 prevents the first node 20 from rotating so that torque from the second MGU 114 can be transferred to the second node 22. When the rotating clutch 21 is engaged, torque from the first MGU 14 is transferred from the first MGU 14 to the first node 20 so that the vehicle 10 can be propelled at least in part using torque from the first MGU 14.

When the input clutch 17 is engaged, torque from the engine 12 is transferred to the first MGU 14 so that the first MGU 14 may be used as a generator when the rotating clutch 21 is disengaged, or to help power the vehicle 10 via the gear set 18 when the rotating clutch 21 is engaged. Other embodiments of the transmission 16 may be used without departing from the intended inventive scope, provided the transmission 16 utilizes clutches that are selectively engaged during a clutch-to-clutch shift, as that term is understood in the art.

The controller 40 shown schematically in FIG. 1 is configured to identify a requested transition from a present operating mode or state to a target operating mode, such as by receiving a desired input speed from a driver of the vehicle 10, and identifies one or more of the clutches of the transmission 16 as being the designated offgoing clutch or clutches during that particular shift. The controller 40 may be further configured to control the disengagement of the offgoing clutches during the transition to a new transmission operating mode/state, and to determine whether the offgoing clutches disengage properly.

The controller 40 may be configured as a digital computer having a processor 42 and a tangible, non-transitory memory device 44, e.g., read only memory (ROM), flash memory, or other magnetic or optical storage media, as well as any required amount of transitory memory such as random access memory (RAM) and electrically-erasable programmable read only memory (EEPROM). The controller 40 may also include a high-speed clock, analog-to-digital (A/D) and digital-to-analog (D/A) circuitry, and input/output circuitry and devices (I/O), as well as appropriate signal conditioning and buffer circuitry.

Figure 2:
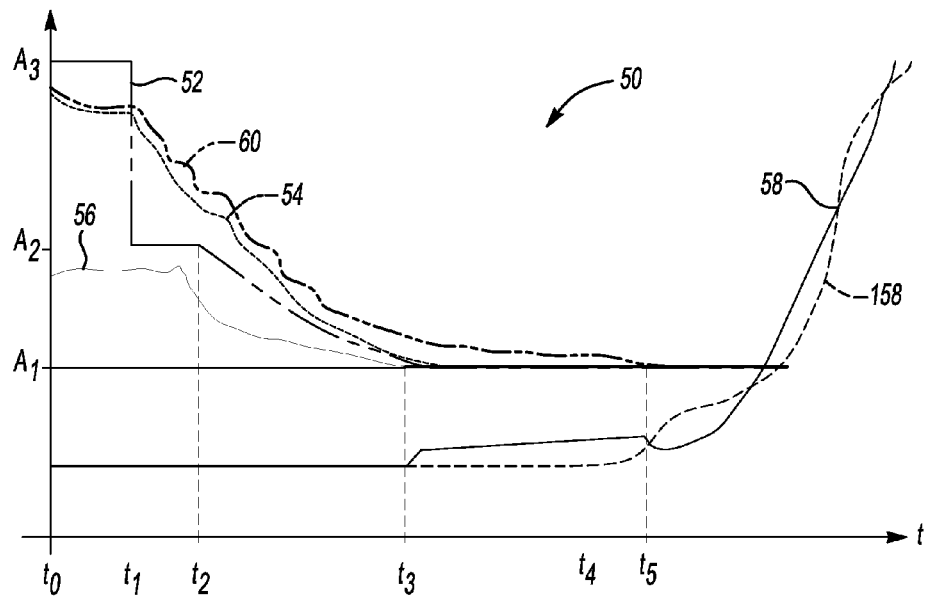
FIG. 2 is a time plot of the amplitudes of example clutch control traces for control of an offgoing clutch within the vehicle of FIG. 1.
Figure 3:
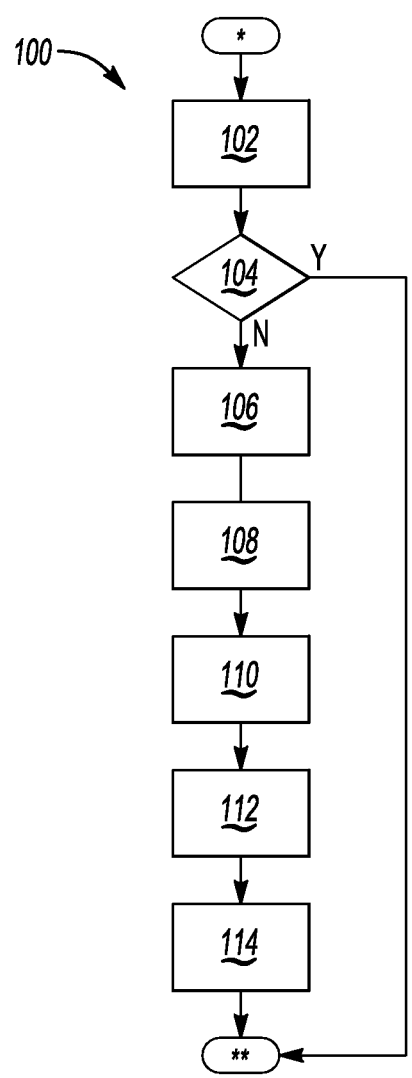
FIG. 3 is a flow chart describing an example method for controlling an offgoing clutch operation in the vehicle shown in FIG. 1.

Referring to FIG. 2, the set of example control traces 50 noted above includes a clutch torque command (trace 52), modeled or estimated clutch torque bearing capacity (trace 54), clutch reactive torque (trace 56), a clutch speed reference profile (trace 58), actual clutch speed (trace 158), and actual clutch torque bearing capacity (trace 60). The actual clutch torque bearing capacity (trace 60) information is not available to the controller 40, and only used for illustration purposes in this particular example. The estimated clutch torque bearing capacity (trace 54) can lead, match, or lag the actual clutch torque bearing capacity (trace 60).

In the example of FIG. 2, the actual clutch torque bearing capacity (trace 60) lags the estimated clutch torque bearing capacity (trace 54), and slowly tapers to zero sometime after the estimated clutch torque bearing capacity (trace 54) reaches zero. The relative amplitudes ($A_1$, $A_2$, $A_3$) are indicated on the vertical axis of FIG. 2 while time (t) is plotted on the horizontal axis. The control traces 50 are representative of just one possible set of shift conditions, and therefore are not intended to be limiting.

A shift is commanded at about $t_0$, with the clutch torque command (trace 52) at a maximum amplitude ($A_3$). FIG. 2 illustrates a particular case in which the actual clutch torque bearing capacity (trace 60) lags the estimated clutch torque bearing capacity (trace 54) by a relatively significant amount.

At $t_1$, the torque phase of the requested shift commences and clutch torque command (trace 52) drops to a lower amplitude ($A_2$), which is still a calibrated amount above the clutch reactive torque (trace 56). Estimated clutch torque bearing capacity (trace 54), which is a modeled value calculated by or otherwise made available to the controller 40 and recorded in the memory device 44, drops in response to the reduced clutch torque command (trace 52). Offloading of torque may be considered complete for the purposes of the present method 100 of FIG. 3 when the clutch reactive torque (trace 56) reaches zero, i.e., at about $t_3$. In other embodiments, a small non-zero clutch reactive torque value may be targeted, e.g., ±5 Nm.

The controller 40 of FIG. 1 tries inducing slip beginning at $t_3$ when the estimated clutch torque bearing capacity (trace 54) reaches below the clutch reactive torque trace 56), which for simplicity will be considered as zero in all of the example embodiments that follow. The clutch speed reference profile (trace 58) is ramped as shown between $t_3$ and $t_5$, which coincides with the tail end of the torque phase of the shift. In this range, the controller 40 can temporarily deactivate closed-loop control over the variables used as the speed profile in executing the method 100. Doing so helps prevent any closed-loop learning of the progressively reducing clutch pressure model error. The estimated clutch torque bearing capacity (trace 54) is communicated to engine torque and motor torque determination algorithms, e.g., of the controller 40 or separate controllers, to ensure that the engine and motor torques together produce a clutch reactive torque (trace 56) that is less than the estimated clutch torque bearing capacity (trace 54). Thus, trace 56 of FIG. 2 is effectively constrained by trace 54, i.e., 0≤|trace 56|≥|trace 54|.

After a calibrated duration, i.e., at about $t_4$ or a later time of $t_5$, closed-loop control may be selectively reactivated by the controller 40. During $t_4$-$t_5$, restricted closed-loop control can be turned back on to aid the slip induction process when sufficient clutch slip is still not observed. That is, the closed-loop control torques may be restricted by small calibration limits. This later time, $t_5$, ends with sufficient observed clutch slip, at which point the full inertia speed phase commences. Not surprisingly, this coincides with the actual clutch torque capacity (trace 60) reaching almost zero, i.e., the clutch being actually offloaded.

The commanded clutch speed reference profile (trace 58) may quickly increase after $t_5$ as shown. Actual clutch speed (trace 158) is then controlled via closed-loop techniques of the type known in the art to closely track the rising clutch speed reference profile (trace 58). The clutch speed reference profile (trace 58) and acceleration continuity are maintained throughout the offgoing process. As will be appreciated by those of ordinary skill in the art, the present approach effectively begins the inertia speed phase of the shift earlier, i.e., at a point near the end of the torque phase, in order to observe/confirm slip across the offgoing clutch(es) prior to transitioning to the full inertia speed phase.

Note that trace 56 of FIG. 2 represents the clutch reactive torque that the controller 40 estimates that it is placing on the controlled offgoing clutch, which may differ from the actual reactive torque. From $t_5$ onward, the controller 40 acts as if it is placing zero load on the offgoing clutch, i.e., the controller 40 operates as if the offgoing clutch is unlocked. In actuality, since the clutch is not actually unlocked, the controller 40 is actually placing an actual load on the offgoing clutch that is proportional to the commanded clutch slip acceleration, i.e., the time derivative of trace 58.

Referring to FIG. 3 in conjunction with the structure of FIG. 1 and the control traces 50 of FIG. 2, upon commencement (*) of the method 100, step 102 is executed by the controller 40. Step 102 begins upon receipt of a request to execute a synchronous shift of the transmission 16. The controller 40 identifies the offgoing clutch or clutches for the requested shift in response to receipt of the request and then measures the slip across the identified offgoing clutch(es). Method 100 then proceeds to step 104.

At step 104, the controller 40 next determines whether the offgoing clutches identified at step 102 have slipped prior to the modeled capacity, i.e., the estimated clutch torque capacity (trace 54) reaching zero, an event which occurs shortly after $t_3$. If an offgoing clutch is slipping at this point, the method 100 is finished (**). The remainder of the shift is controlled in the ordinary manner through the ensuing inertia phase. The method 100 proceeds to step 106 only if the offgoing clutch has not yet slipped when the estimated clutch torque capacity (trace 54) reaches zero.

At step 106, the controller 40 assign a disengaged/open status to the offgoing clutch records, e.g., by recording a value in the memory device 44, indicating that the offgoing clutch identified at step 102, which is not yet slipping, is disengaged/off. The method 100 then proceeds to step 108. Note that the offgoing clutch may not actually be open, as the controller 40 has no actual clutch pressure feedback information. Regardless, the controller 40 proceeds from this point of the method 100 as if the offgoing clutch were in fact open, e.g., by communicating the open status of the offgoing clutch to a hybrid control processor (HCP) or other higher level controller used to coordinate the torque inputs to the transmission 16 of FIG. 1, e.g., the engine 12, the MGU 14, and/or the MGU 114.

At step 108, the controller 40 next turns off closed-loop control of the offgoing clutch and proceeds to step 110. Because the HCP or other higher-level controller was informed at step 106 that the offgoing clutch is open, closed-loop control over the offgoing clutch does not fight the slip as it occurs.

At of step 110, a calibrated clutch acceleration value may be applied by the controller 40. This value is referred to herein as the $\dot{N}c$ value, i.e., the time derivative of clutch speed (Nc). Thus, Nc and $\dot{N}c$ are interdependent, as will be appreciated by those having ordinary skill in the art. For instance, the $\dot{N}c$ value may be a slip of 1000 RPM/s. That's equivalent of observing 50 RPM of slip in 50 ms of observation window. Given the $\dot{N}c$ value, the controller 40 can adjust the acceleration across the offgoing clutch as needed if the first and/or second MGUs 14, 114 are present alone, or if the engine 12 is added to the driveline.

As part of step 110, the controller 40 attempts to control clutch offgoing slip to a calibrated small, non-zero slip speed, e.g., 50 RPM or less in one embodiment. This can be seen in FIG. 2, trace 58, between $t_3$ and $t_4$, a period which corresponds to the slip induction phase. The method 100 then proceeds to step 112.

Given a "threshold load" approach as generally described above, to control slip, with load (T) being equal to T=αI, α representing the actual acceleration, and I representing the inertia of the driveline across the clutch, one does not know the actual acceleration (α) with any level of precision. The addition of the engine 12 to the driveline adds substantial inertia (I). With a fixed load (T), the controller 40 operates as if the offgoing clutch were engaged, and closed-loop controls work to drive the actual slip to zero. This result is avoided using the profile-based slip control approach as shown in FIG. 2.

At step 112, the controller 40 turns closed-loop control of the speed profile associated with the still offgoing clutch back on between $t_4$ and $t_5$ of FIG. 2. Closed loop control in this period aids the slip induction process. The method 100 proceeds to step 114.

At step 114, $t_5$ ends when sufficient clutch slip is observed, at which point the full inertia speed phase of the shift commences. Clutch speed rapidly increases after $t_5$, as shown by trace 58 of FIG. 2.

The present control approach can also be used to detect a stuck clutch. That is, if the offgoing clutch is hydraulically stuck, the offgoing clutch will not slip when it is expected to. In FIG. 2, for instance, slip is expected to occur at about $t_5$ after torque offloading has completed. After a calibrated amount of time has elapsed in the slip induction phase without any observed clutch slip, the clutch stuck diagnostic will mature. As part of step 112, therefore, the controller 40 can command an operating mode in which the offgoing clutch is expected to be engaged. This provides a fail safe mode.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a torque generating device;
a transmission having an input member, a planetary gear set, and a clutch set, wherein the input member is connected to and receives input torque from the torque generating device, and also transfers the input torque through the planetary gear set in response to a commanded shift; and
a controller in communication with the transmission, wherein the controller includes a tangible, non-transitory memory device on which is recorded a modeled clutch torque capacity of each clutch used in the clutch set and instructions for executing a commanded shift involving an offgoing clutch of the clutch set to a subsequent transmission state;
wherein the controller is configured to execute the instructions in response to the commanded shift using at least one calibrated acceleration profile of the offgoing clutch, including:
identifying the offgoing clutch for the commanded shift; and
inducing slip across the identified offgoing clutch in an open loop using the at least one calibrated acceleration profile at a point of the torque phase of the commanded shift at which the modeled clutch torque capacity of the offgoing clutch is zero.

2. The vehicle of claim 1, wherein the offgoing clutch includes a plurality of offgoing clutches, and wherein the controller is configured to induce the slip across at least one of the identified offgoing clutches.

3. The vehicle of claim 1, wherein the torque generating device is one of an internal combustion engine and an electric traction motor.

4. The vehicle of claim 3, wherein the torque generating device is both of the internal combustion engine and the electric traction motor.

5. The vehicle of claim 1, wherein the controller is configured to:
determine whether the offgoing clutch has slipped prior to the modeled clutch torque capacity reaching zero; and
assign a disengaged/open status to the offgoing clutch when the offgoing clutch has not slipped prior to the modeled clutch torque capacity reaching zero.

6. The vehicle of claim 1, wherein the controller is further configured to control the slip of the at least one offgoing clutch to a calibrated low, non-zero slip speed using, as the at least one acceleration profile, a calibrated clutch acceleration profile when the modeled clutch torque capacity is zero and the at least one offgoing clutch has not slipped.

7. The vehicle of claim 1, wherein the controller temporarily disables closed-loop control of a speed profile of the at least one offgoing clutch at the point of the torque phase at which the modeled clutch torque capacity is zero.

8. A method comprising:
recording a modeled clutch torque capacity of a plurality of clutches in a transmission in a memory device of a controller;
receiving a request for a commanded shift having a torque phase and involving one or more of the clutches;
identifying, via a controller, any offgoing clutches of the plurality of clutches that must be released to offload torque during the commanded shift;
measuring an amount of slip across the identified offgoing clutches;
determining whether any of the identified offgoing clutches have slipped prior to the modeled clutch torque capacity reaching zero;
assigning a released/open status to the identified offgoing clutches via the controller indicating that the offgoing clutches are released if the corresponding offgoing clutch has not yet slipped when the modeled clutch torque capacity reaches zero; and
controlling slip across each of the identified offgoing clutches in an open loop via the controller after assigning the released/open status, including enforcing a calibrated low, non-zero slip value using at least one calibrated acceleration profile of the identified offgoing clutches at a point of the torque phase at which the modeled clutch torque capacity of the offgoing clutch is zero.

9. The method of claim 8, further comprising:
disabling closed-loop control of slip of the offgoing clutches.

10. The method of claim 8, further comprising:
using a calibrated slip acceleration/time value to adjust slip across the offgoing clutches in a manner that corresponds to the combination of torque generating devices.

11. The method of claim 8, further comprising:
executing a control action when the offgoing clutches do not slip when the modeled clutch torque capacity is zero.

12. The method of claim 11, wherein executing a control action includes recording a diagnostic code identifying that at least one of the identified offgoing clutches is stuck.

13. The method of claim 11, wherein executing a control action includes commanding a transmission operating mode in which the identified offgoing clutches are expected to be engaged.

14. A method comprising:
recording a modeled clutch torque capacity of a plurality of clutches in a transmission in a memory device of a controller;
receiving a request for a commanded shift involving releasing of one or more of the clutches;
identifying, via a controller, at least one offgoing clutch among the plurality of clutches which are to be released during the commanded shift;
measuring an amount of slip across each of the identified offgoing clutches;
determining whether the identified offgoing clutches have slipped prior to the modeled clutch torque capacity reaching zero;
assigning a released/open status to the identified offgoing clutch indicating that the identified offgoing clutch is disengaged/off if the identified offgoing clutch has not yet slipped when the modeled clutch torque capacity reaches zero;
controlling slip across the identified offgoing clutches after assigning the status, including:

enforcing a calibrated low, non-zero slip value using at least one calibrated acceleration profile of the identified offgoing clutches in an open loop during a torque phase of the commanded shift; and disabling closed-loop slip control of the offgoing clutches after assigning the released/open status; and executing a control action when the offgoing clutches do not slip when the modeled clutch torque capacity is zero, including recording a diagnostic code in the memory device indicating that at least one of the offgoing clutches is stuck.

15. The method of claim 14, wherein executing a control action includes commanding a transmission operating mode in which the identified offgoing clutches are expected to be engaged.

16. The method of claim 14, further comprising:

using a calibrated slip acceleration/time value to adjust the slip across the identified offgoing clutches in a manner that corresponds to the combination of torque generating devices.

* * * * *